United States Patent
Kim et al.

[11] Patent Number: 6,135,683
[45] Date of Patent: Oct. 24, 2000

[54] PARALLEL MECHANISM FOR MULTI-MACHINING TYPE MACHINING CENTER

[75] Inventors: Jongwon Kim, 110-402, Hyundae Apartment, Suso-Dong, Kangnam-Ku, Seoul, 135-220; Chongwoo Park, 789-29, Yoksam-Dong, Kangnam-Ku, Seoul, 135-080; Wok-Kwan Bae, Kyunki-Do; Seon-joong Liu, Seoul; Jinwook Kim, Seoul; Jae-chul Hwang, Seoul; Changbum Park, Pusan; Han-Sang Cho, Seoul; Gyu-Young Lee, Seoul; Kiha Lee, Seoul; Yonghun Lee, Seoul; Cornel Iurascu, Seoul, all of Rep. of Korea

[73] Assignees: Jongwon Kim; Chongwoo Park, both of Rep. of Korea

[21] Appl. No.: 09/183,194

[22] Filed: Oct. 30, 1998

[30]  Foreign Application Priority Data

Nov. 5, 1997 [KR] Rep. of Korea ....................... 97-58254
Nov. 12, 1997 [KR] Rep. of Korea ....................... 97-59556

[51] Int. Cl.⁷ ....................................................... B23C 1/12
[52] U.S. Cl. ....................... 409/132; 74/790.03; 409/201; 409/216; 409/235; 408/236
[58] Field of Search .............................. 29/26 A; 409/132, 409/201, 211, 216, 235; 408/234, 236, 88; 74/490.03

[56]  References Cited

U.S. PATENT DOCUMENTS

| 2,823,591 | 2/1958 | Craddock et al. | 409/201 |
| 5,267,818 | 12/1993 | Marantette | 409/235 |
| 5,401,128 | 3/1995 | Lindem et al. | |
| 5,466,085 | 11/1995 | Sheldon et al. | |
| 5,575,597 | 11/1996 | Bailey et al. | |
| 5,715,729 | 2/1998 | Toyama et al. | 409/235 |
| 5,941,128 | 8/1999 | Toyama et al. | 409/211 |
| 5,960,672 | 10/1999 | Pritschow et al. | 74/490.03 |

*Primary Examiner*—Daniel W. Howell
*Attorney, Agent, or Firm*—Knobbe, Martens, Olson & Bear LLP

[57] ABSTRACT

A six-degree-of-freedom parallel mechanism is provided for expanding a grade of a spindle. The parallel mechanism has a spindle that turns round a workpiece at a tilting angle of 90° in a workspace, to thereby allow a machining for both vertical and horizontal planes of the workpiece, and a vertical turning process, by a single machining center. A six-axis multi-machining type machining center embodying the parallel mechanism of the present invention is also disclosed. An over-actuated multi-machining type machining center further including over-actuated actuators is presented to solve a problem of driving joints' singularity caused by the parallel mechanism.

43 Claims, 21 Drawing Sheets

PARALLEL MECHANISM FOR MULTI-MACHINING TYPE MACHINING CENTER

BACKGROUND OF THE INVENTION

1. Field of the Invention

The present invention relates to a machining center, and more particularly, to a parallel mechanism for allowing a pentahedral machining by a single set-up, and for allowing a multi-machining including turning, boring, drilling, grinding as well as milling.

2. Description of the Related Art

It is necessary to control a three-dimensional position and orientation of a tool, in machining using a machining center, so as to shape and form raw materials into useful, desired products. A serial mechanism shown in FIG. 1, is the most fundamental mechanism, used for manipulating the position and orientation control. The serial mechanism has a construction which allows every shaft between a base 1000 and a spindle 1200 to be at right angles with one another. This mechanism has the advantages of a relatively large workspace, and a simplified operation software and controller.

In recent years, there has been made a study of a parallel mechanism capable of motion in six degrees of freedom, employed for a machining center. The parallel mechanism features a design that can connect a base and a spindle parallel with each other, by using a plurality of links.

FIG. 2 shows a typical parallel mechanism, explaining a hexapod structure which allows connecting a base 2100 and a spindle 2200 by means of six links. These links are expanded to be capable of motion in six degrees of freedom.

In general, the machining center with the hexapod structure is divided into two kinds according to a position of the spindle: vertical machining center and horizontal machining center. The former is to machine only a vertical plane of a workpiece. The latter is to machine only a horizontal plane of a workpiece. Therefore, a machining for both vertical and horizontal planes of a workpiece isn't achieved by a single machining center. In addition, a turning process is impossible by the machining center with the typical parallel mechanism, requiring an additional process on a lathe.

SUMMARY OF THE INVENTION

Accordingly, the present invention is directed to a parallel mechanism for multi-machining type machining center that substantially obviates one or more of the limitations and disadvantages of the related art.

An object of the present invention is to provide a six-degree-of-freedom parallel mechanism employed for expanding a spindle tilting angle.

Another object of the present invention is to provide a parallel mechanism having a spindle that turns round a workpiece at a tilting angle of 90° in a workspace, to thereby allow a machining for both vertical and horizontal planes of the workpiece, and a vertical turning process, by a single machining center.

Still another object of the present invention is to provide a six-axis machining center with a six-degree-of-freedom parallel mechanism.

Still another object of the present invention is to provide an over-actuated machining center designed for increasing robustness of a six-axis machining center.

Additional features and advantages of the invention will be set forth in the description which follows, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, a parallel mechanism includes: three fixed length links connected to a spindle; three rectilinear, vertical guides for moving the three links in a vertical direction; a circular, horizontal guide for allowing the vertical guides to move on its circular arc; spherical joints for connecting the spindle to the three fixed length links; revolute joints for connecting the fixed length links to the rectilinear, vertical guides; prismatic joints on a rectilinear line, allowing vertical movement of the fixed length links on the rectilinear, vertical guides; and prismatic joints on a circular arc, allowing horizontal movement of the three rectilinear, vertical guides on the circular, horizontal guide.

A multi-machining type machining center allowing a pentahedral machining by a single set-up, and a multi-machining including vertical turning, boring, drilling, grinding, etc. is attained by using the parallel mechanism of the present invention.

A basic six-axis multi-machining type machining center allows a tool to be capable of motion in six degrees of freedom by six actuators including three actuators for actuating the prismatic joints on a rectilinear line, allowing vertical movement of the three fixed length links on the rectilinear, vertical guides, and three actuators for actuating the prismatic joints on a circular arc, allowing horizontal movement of the three rectilinear, vertical guides on the circular, horizontal guide.

To solve an actuator's singularity of the parallel mechanism, an over-actuating machining center is provided by the present invention. A seven-axis over-actuated machining center includes an over-actuating actuator for over-actuating one of the three revolute joints, in addition to the six basic actuators of six-axis machining center, in such a way that a tool is capable of motion in six degrees of freedom. However, the problem of actuator's singularity isn't solved completely.

In this connection, the present invention provides an eight-axis over-actuated machining center, in order to completely solve the above-mentioned problem. This machining center includes two over-actuating actuators for over-actuating two of the three revolute joints, in addition to the six basic actuators of six-axis machining center. Therefore, a tool is capable of motion in six degrees of freedom by a total of eight actuators.

To consider symmetry of over-actuated machining center and increase robustness of machining center, moreover, a nine-axis over-actuated machining center provided by the present invention, includes three over-actuating actuators for over-actuating all of the three revolute joints.

The multi-machining type machining center with the parallel mechanism according to the present invention, allows a pentahedral machining by a single set-up, particularly a vertical turning process.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

Figure 20:
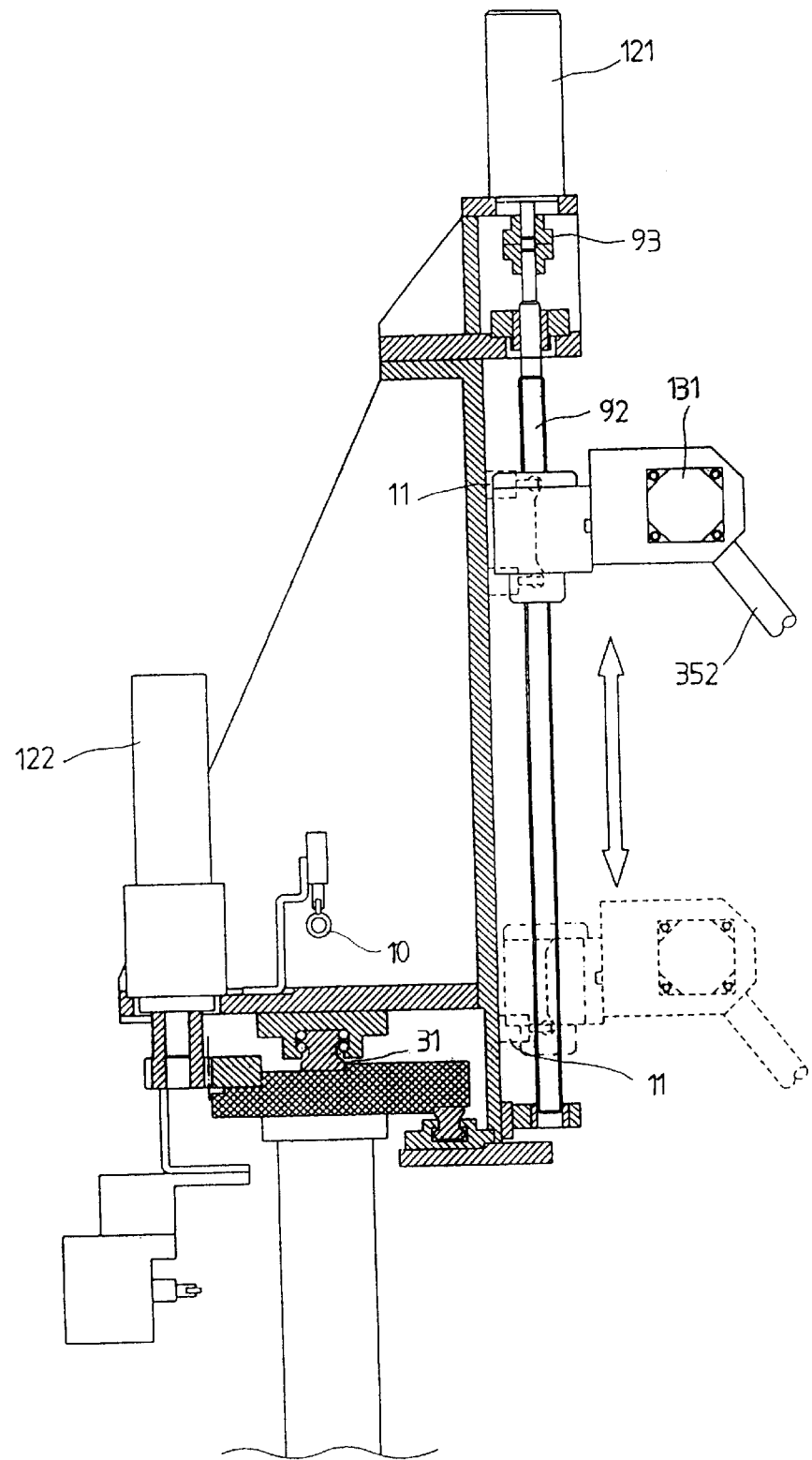
Figure 21:
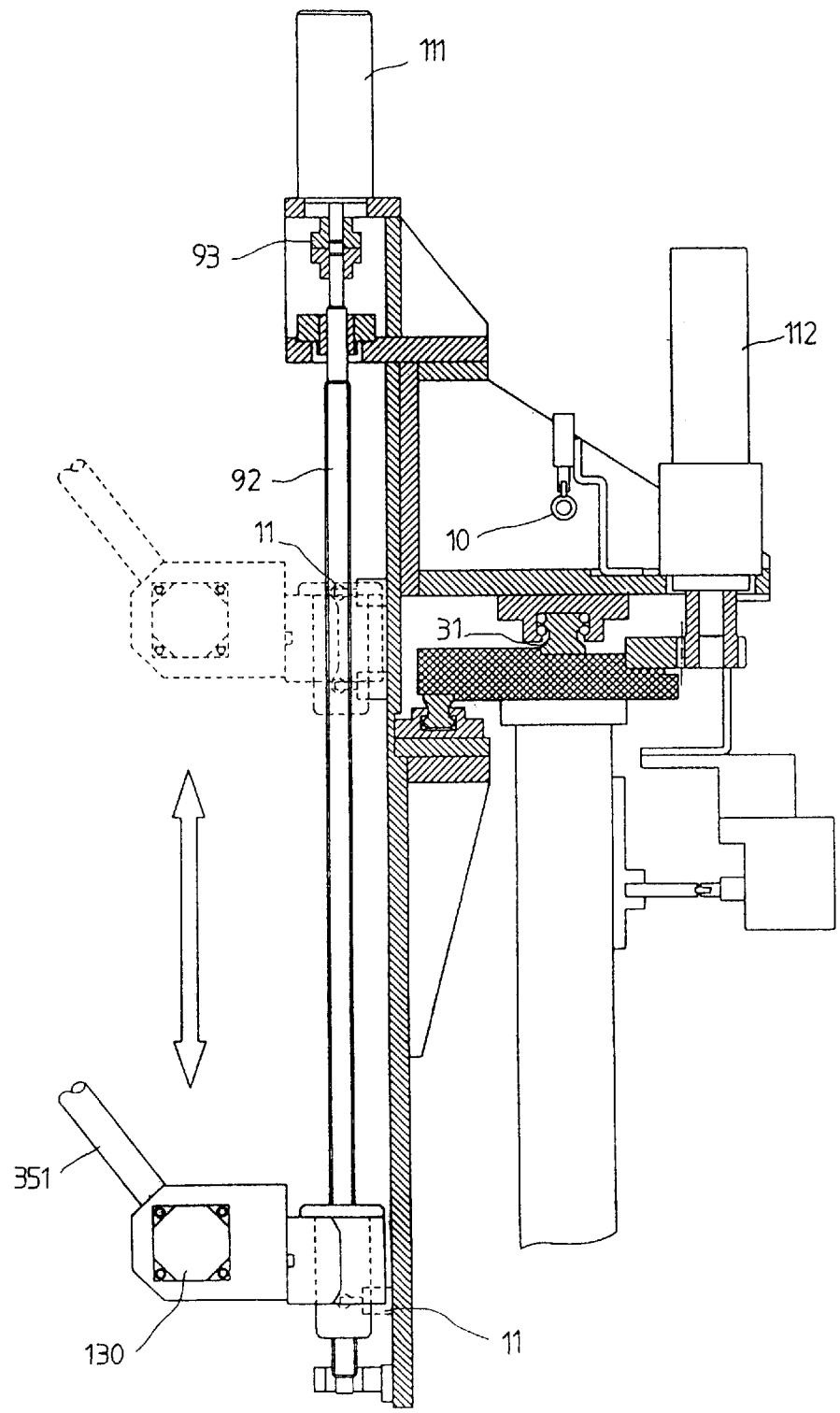

FIG. 20 in detail shows an upward rectilinear, vertical guide of the eight-axis over-actuated machining center of the present invention; and FIG. 21 in detail shows a downward rectilinear, vertical guide of the eight-axis over-actuated machining center of the present invention.

DETAILED DESCRIPTION OF PREFERRED EMBODIMENT

Reference will now be made in detail to the preferred embodiments of the present invention, examples of which are illustrated in the accompanying drawings.

Figure 1:
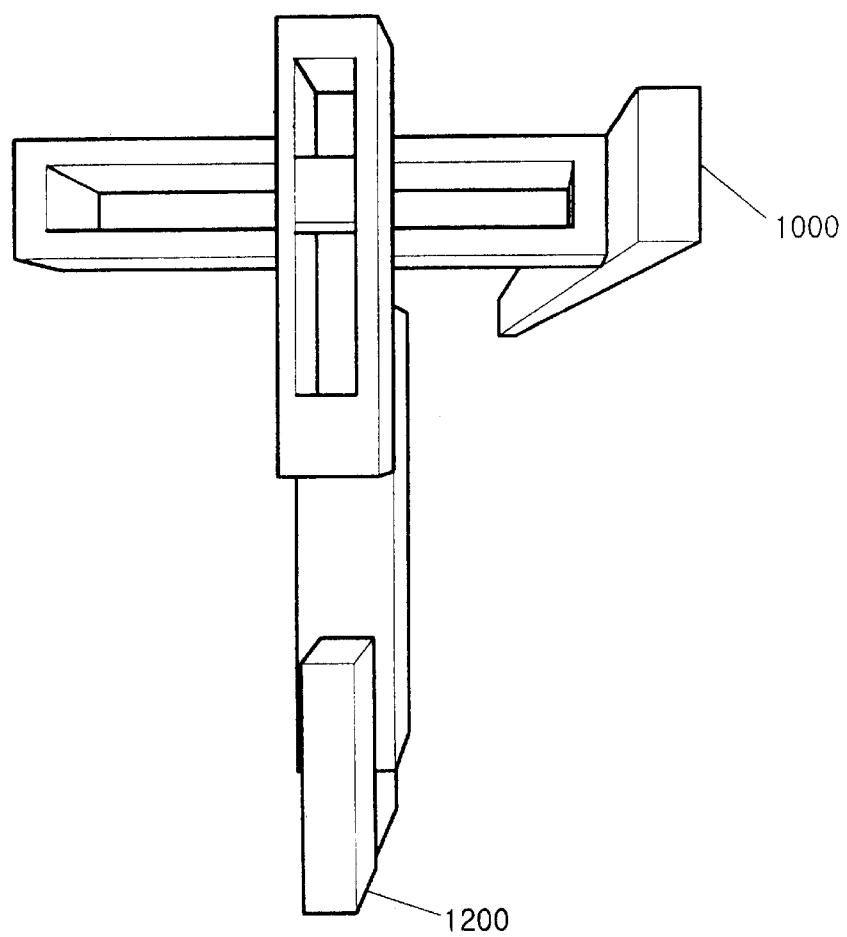
FIG. 1 shows a typical serial mechanism.
Figure 2:
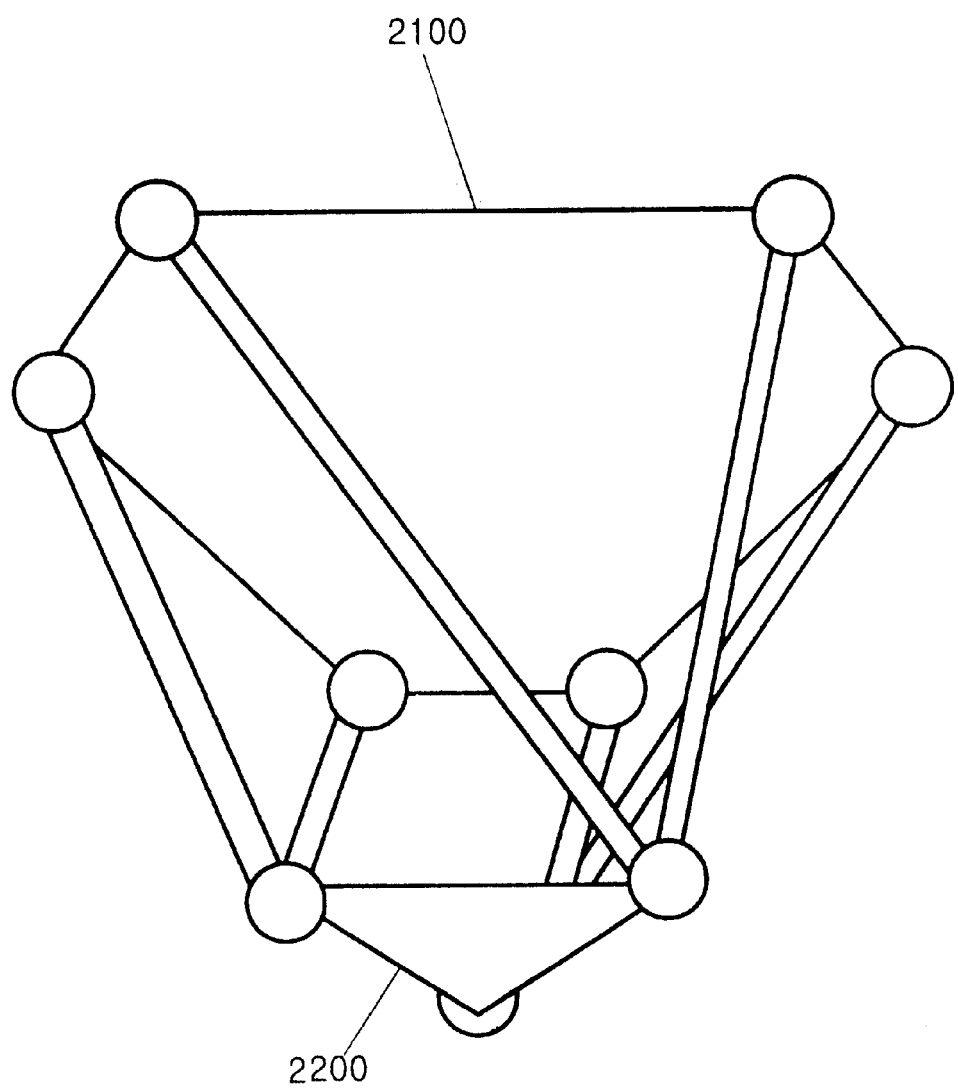
FIG. 2 depicts a typical hexapod type parallel mechanism.
Figure 3:
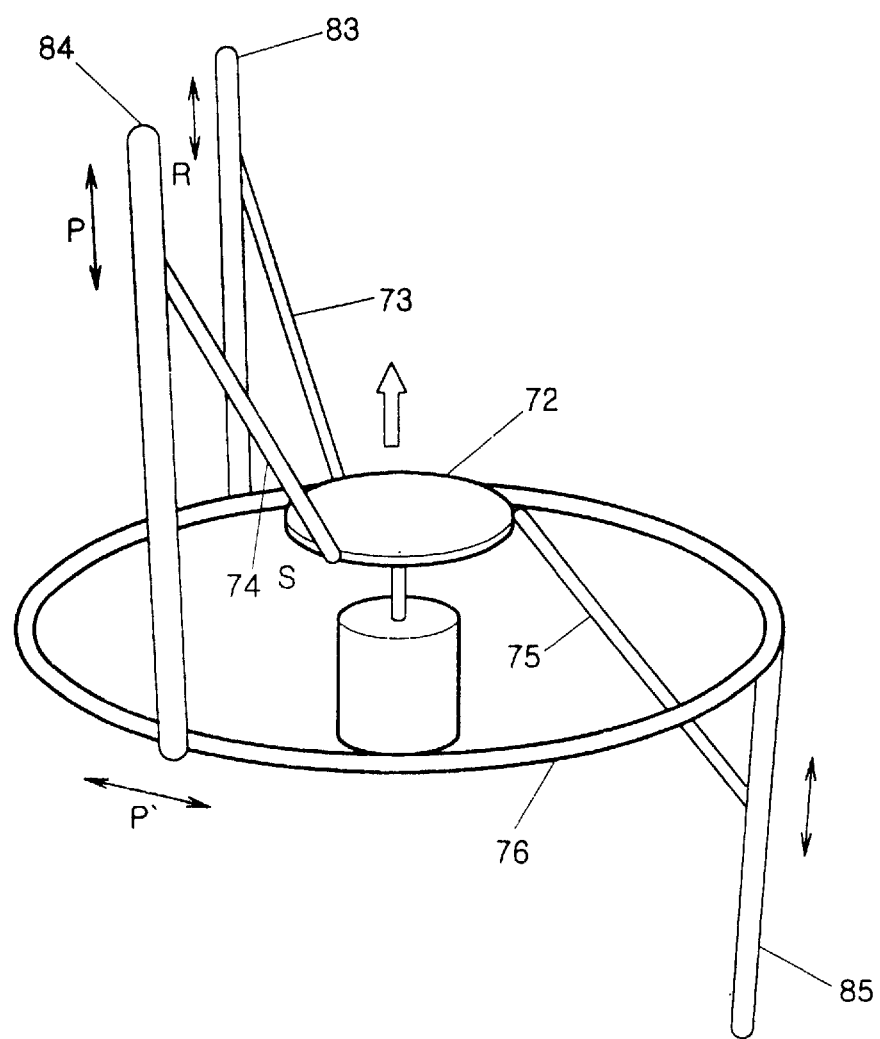
FIG. 3 shows a parallel mechanism of the present invention.

Referring to FIG. 3 showing a parallel mechanism according to the present invention, a spindle 72 is connected to three fixed length links 73, 74, and 75, that may be equal or different in length. The links 73, 74, and 75 shown in FIG. 3 have the same lengths. These three fixed length links 73, 74, and 75 move along three corresponding rectilinear, vertical guides 83, 84, and 85 in a vertical direction. A circular, horizontal guide 76 allows the rectilinear, vertical guides 83, 84, and 85 to move horizontally on its circular arc.

The following description will now relate to a connection between the spindle 72, three fixed length links 73, 74, and 75, three vertical guides 83, 84, and 85, and circular, horizontal guide 76. The spindle 72 and three fixed length links 73, 74, and 75 are connected by spherical joints S. Revolute joints R connect the three fixed length links 73, 74, and 75 with the corresponding rectilinear, vertical guides 83, 84, and 85. They are connected to the rectilinear, vertical guides by prismatic joints P on a rectilinear line, in order to vertically move the fixed length links 73, 74, and 75 on the corresponding rectilinear, vertical guides 83, 84, and 85. Prismatic joints P' on a circular arc connect the three rectilinear, vertical guides 83, 84, and 85 and circular, horizontal guide 76, for the purpose of horizontally moving these guides 83, 84, and 85 on the guide 76.

The basic active joints of the parallel mechanism are the prismatic joints P on rectilinear line, for allowing the three fixed length links 73, 74, and 75 to move vertically on three rectilinear, vertical guides 83, 84, and 85, and prismatic joints P' on circular arc, for allowing the three rectilinear, vertical guides 83, 84, and 85 to move horizontally on circular, horizontal guide 76. These six joints are driven to make the spindle capable of motion in six degrees of freedom.

To prevent a workspace from getting smaller in area, two 83 and 84 of three rectilinear, vertical guides 83, 84, and 85 are located above the circular, horizontal guide 76, and the rest 85 is positioned under the guide 76.

Figure 4:
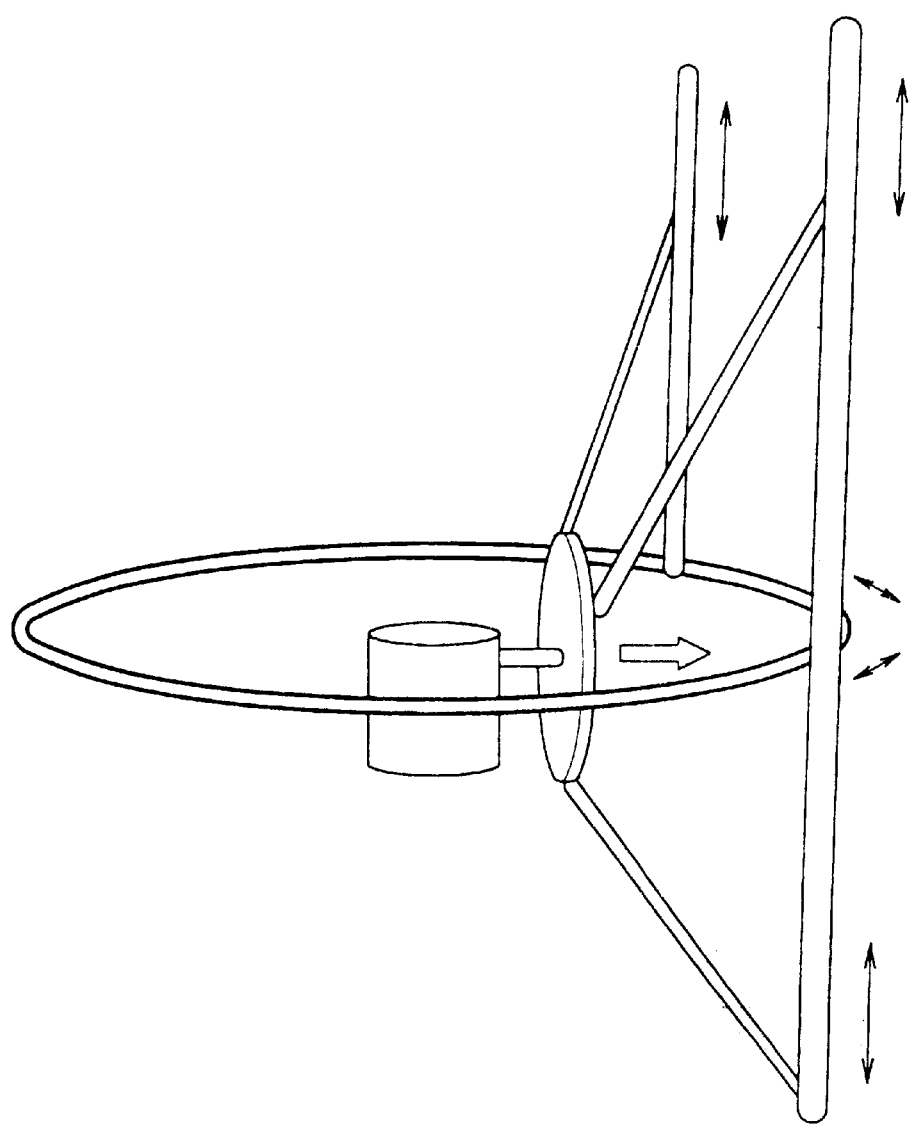
FIG. 4 illustrates a state in which a spindle is at a tilting angle of 90° in the parallel mechanism of FIG. 3.

FIG. 4 illustrates a state in which the spindle is at a tilting angle of 90° in the parallel mechanism of FIG. 3. As shown in FIG. 4, the spindle is capable of motion at a tilting angle of 90°. It is hard to raise a tilting angle of the spindle up to 90° in a typical parallel mechanism. This is because there is a limit to a rotation angle of spherical joints for connecting the spindle and plural links.

Figure 5:
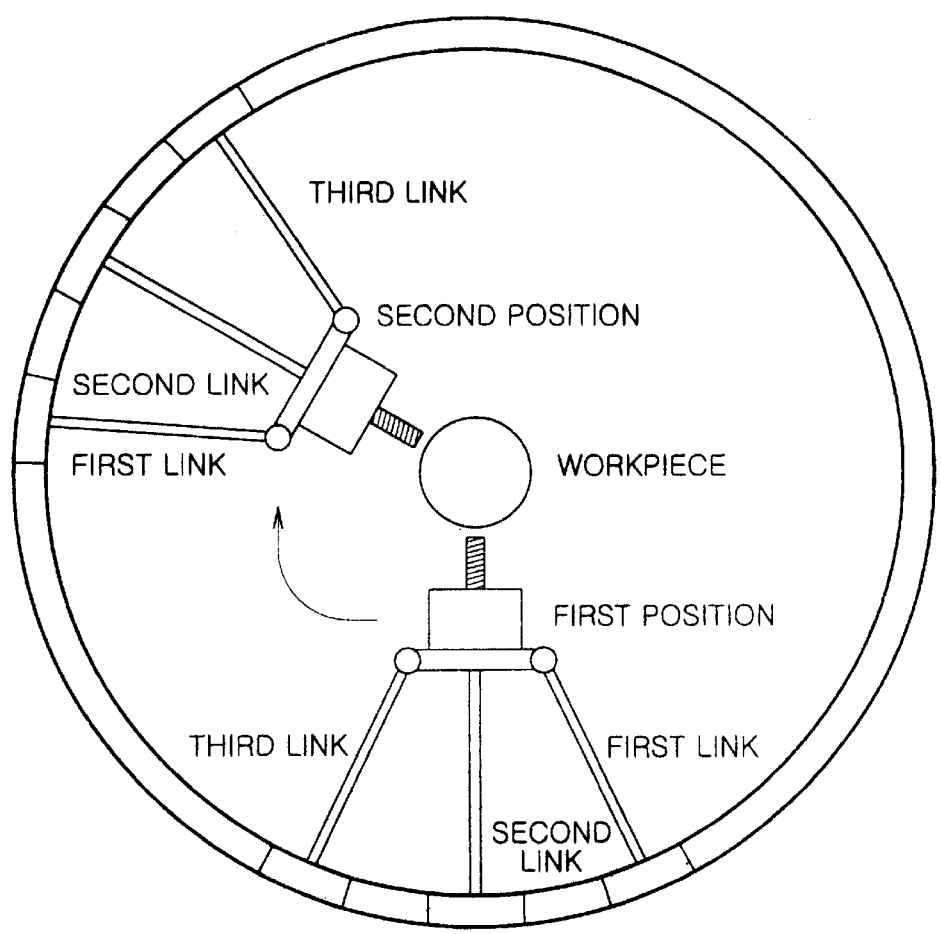
FIG. 5 is a plan view of a state in which the spindle is at a tilting angle of 90° while a tool turns round a workpiece, in the parallel mechanism of FIG. 3.

FIG. 5 is a plan view of a state in which the spindle is at a tilting angle of 90° while a tool turns round a workpiece, in the parallel mechanism of FIG. 3. Even though the spindle at a tilting angle of 90° turns from a first position to a second position, three fixed length links maintain their relative positions, and three rectilinear, vertical guides move on circular, horizontal guide, so that there is no change in the angle of spherical joints S for connecting the spindle and three fixed length links.

The following, detailed description relates to a multi-machining type machining center embodied by the parallel mechanism of the present invention, with reference to FIGS. 6 to 11.

Figure 6:
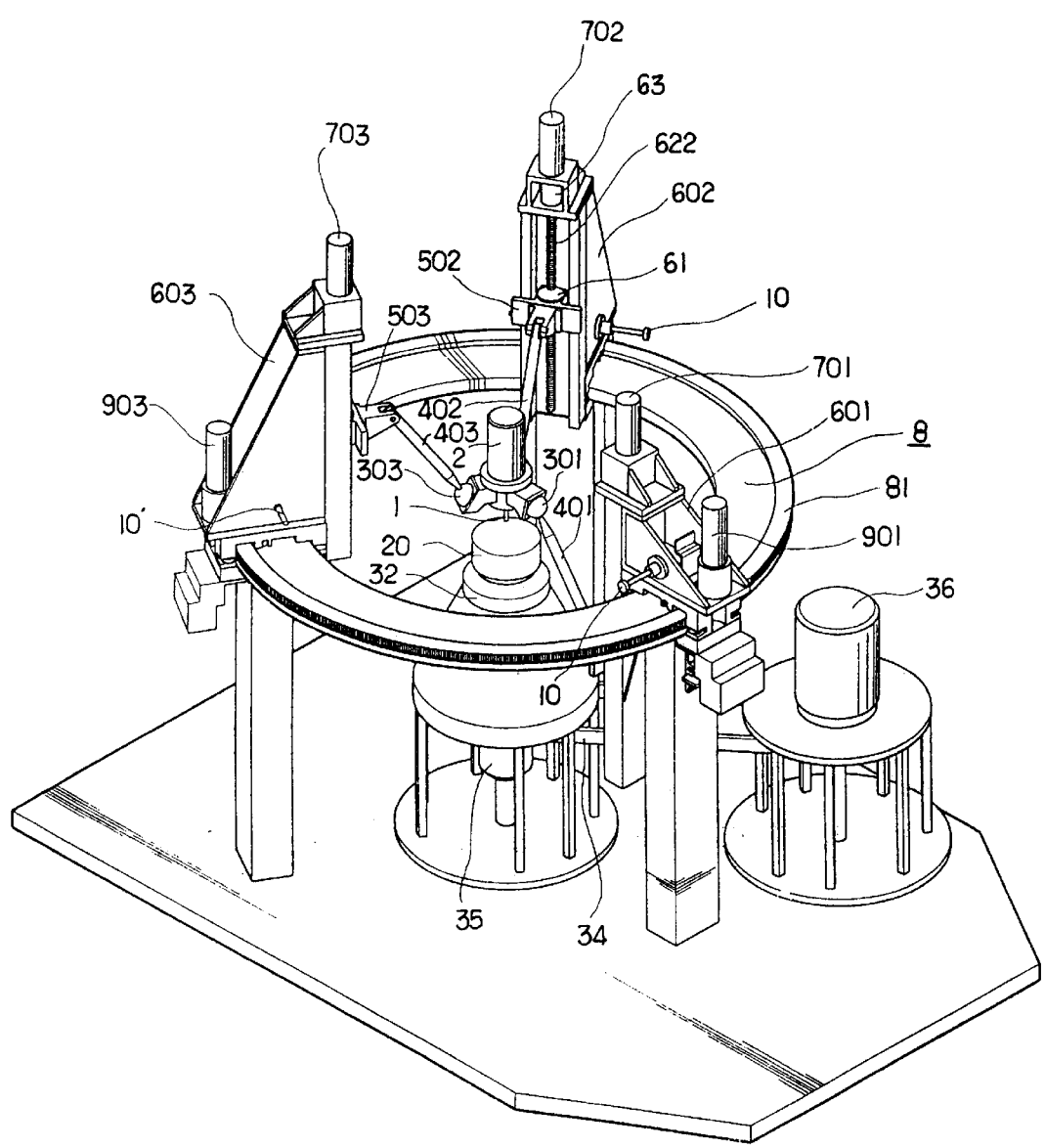
FIG. 6 is a perspective view of a six-axis multi-machining type machining center embodied by the parallel mechanism of the present invention.
Figure 7:
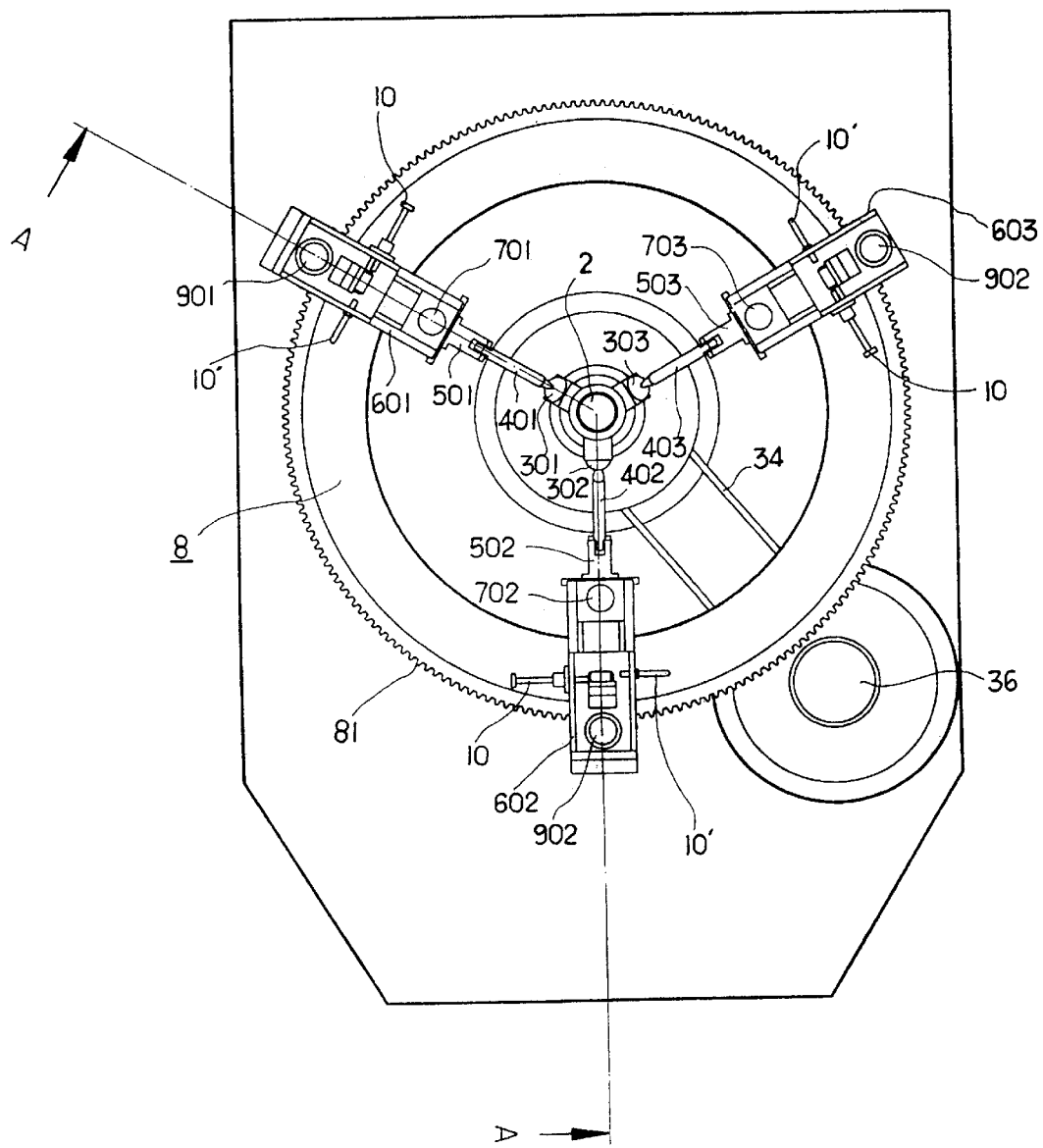
FIG. 7 is a plan view of FIG. 6.
Figure 8:
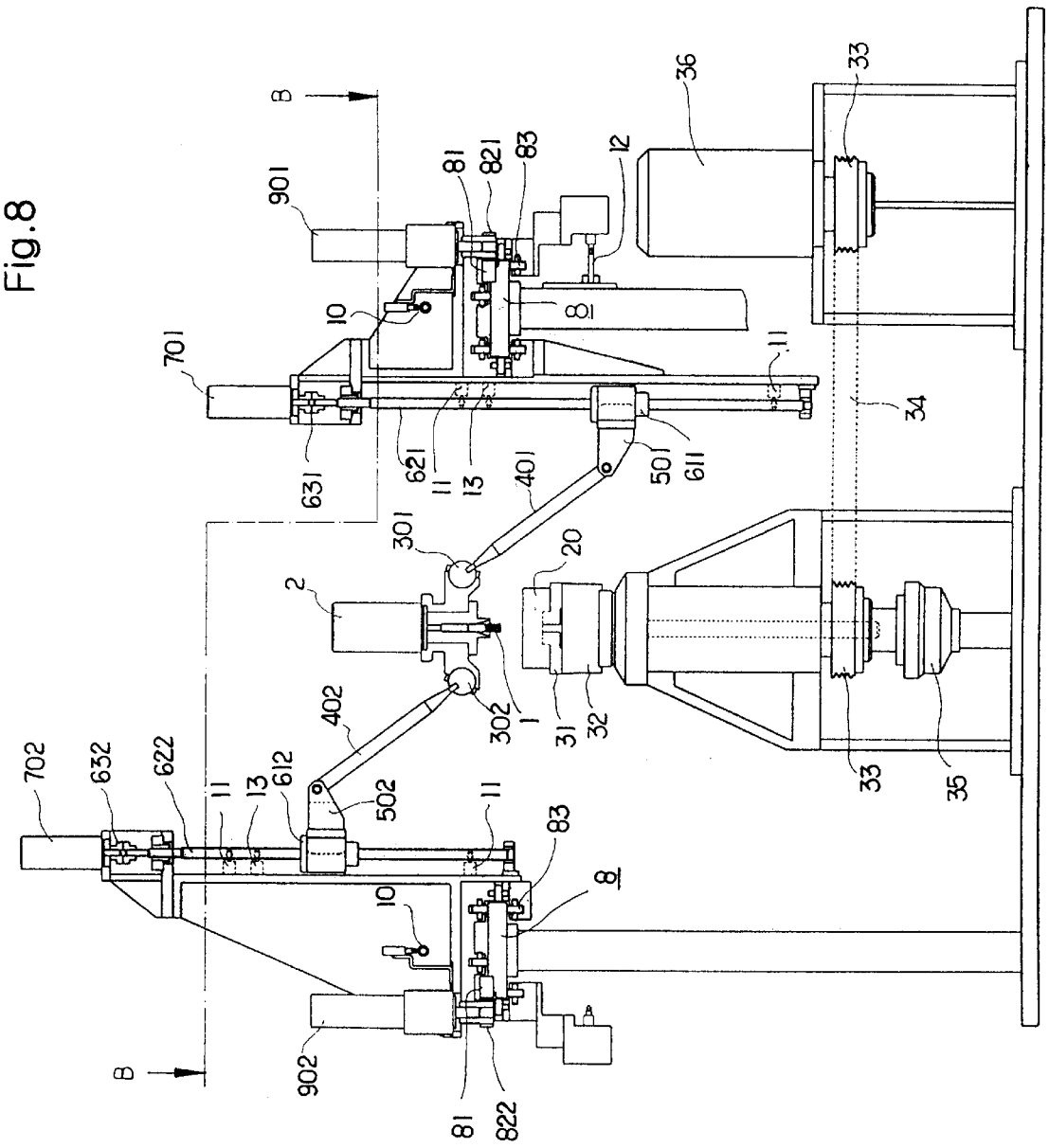
FIG. 8 is a cross-sectional view taken along the line A—A of FIG. 7.

FIG. 6 is a perspective view of a six-axis multi-machining type machining center embodied by the parallel mechanism of the present invention, FIG. 7 is a plan view of FIG. 6, and FIG. 8 is a cross-sectional view taken along the line A—A of FIG. 7.

The multi-machining type machining center comprises: a spindle system including a tool 1 and a spindle motor 2 for allowing rotation of the tool; and a movement system for determining a position and orientation of the tool.

Three fixed length links 401, 402, and 403 are connected to the spindle system by means of spherical joints 301, 302, and 303. The three fixed length links 401, 402, and 403 are equal or different in length. The links 401, 402, and 403 shown in FIG. 6 have the same lengths. The spherical joints 301, 302, and 303 have the advantage of a relatively large, allowable angle of inclination more than 50°, in comparison to typical spherical joints with a tilting angle of 40°.

Rectilinear, vertical guides 601, 602, and 603 and the three fixed length links 401, 402, and 403 are connected by corresponding revolute joints 501, 502, and 503. Three fixed length links 401, 402, and 403 connected to the revolute joints 501, 502, and 503 are driven by respective actuators for vertical movement 701, 702, and 703, to move vertically. The rectilinear, vertical guides 601, 602, and 603 include two upward rectilinear, vertical guides 602 and 603 that are disposed above a circular, horizontal guide 8, a downward rectilinear, vertical guide 601 that is positioned under the guide 8. As another embodiment, there may be provided an upward rectilinear, vertical guide and two downward rectilinear, vertical guides.

Figure 9:
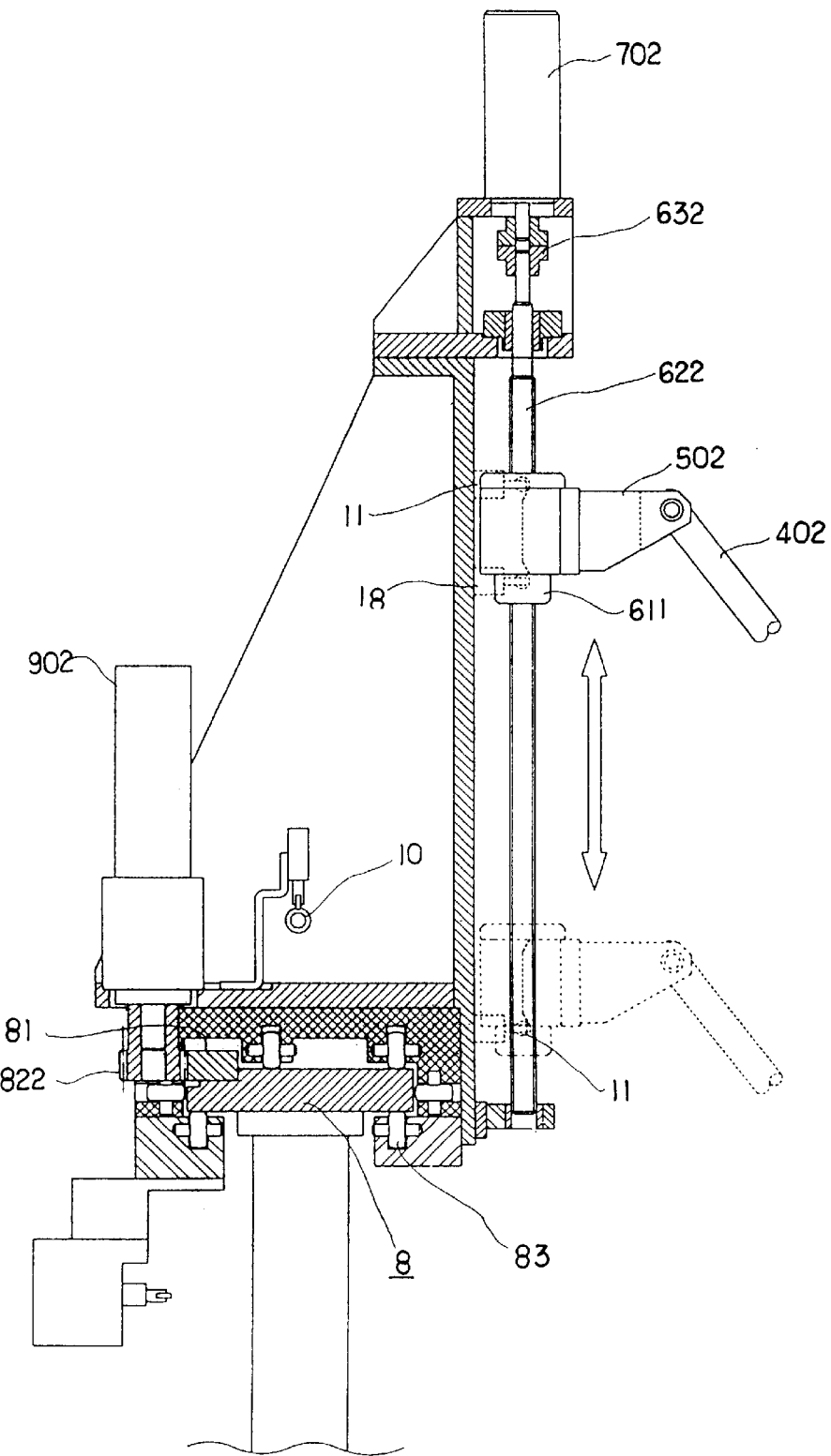
FIG. 9 is a cross-sectional view taken along the line B—B of FIG. 8, that is a cross-section of an upward vertical guide.
Figure 10:
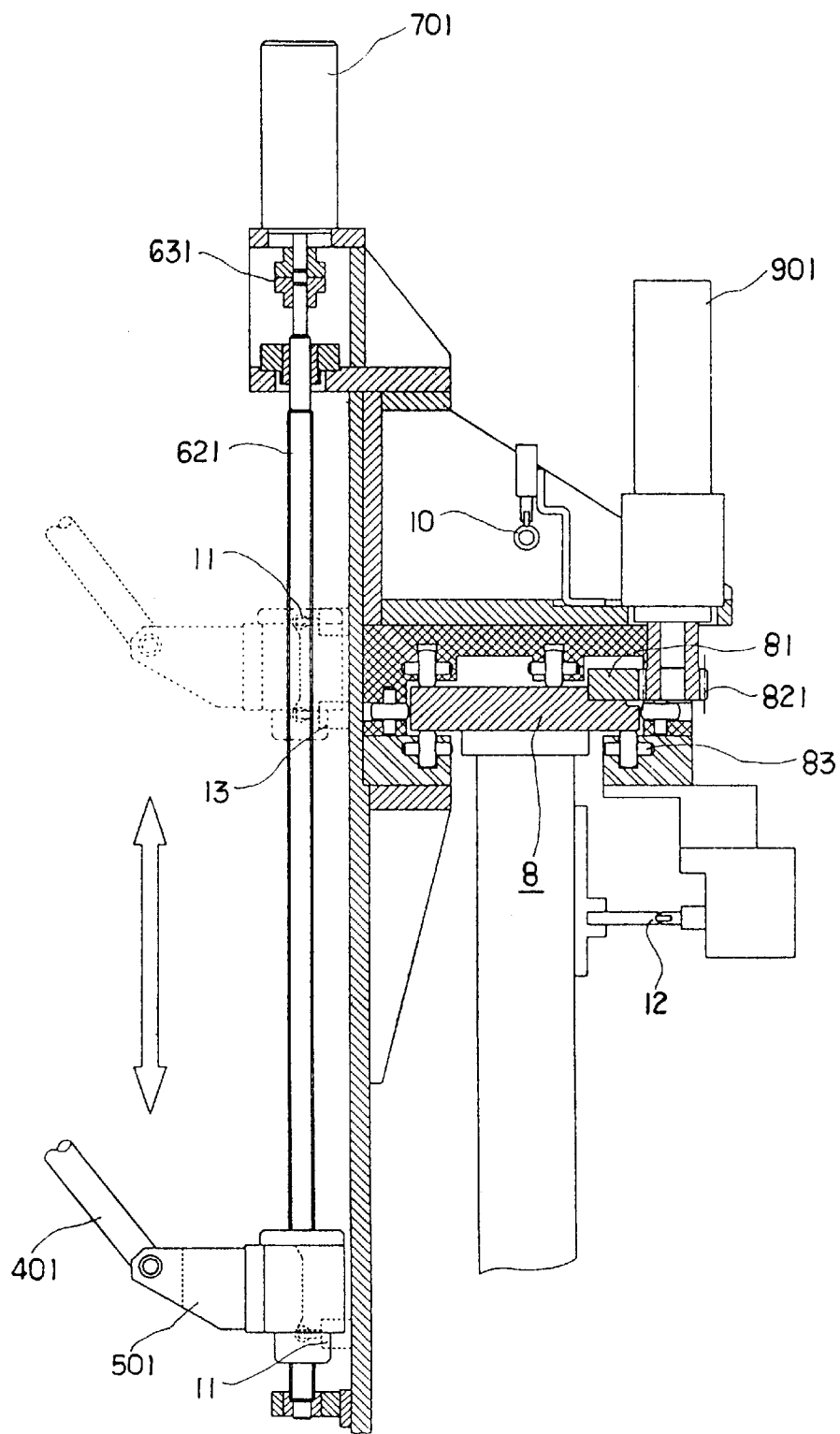
FIG. 10 is a cross-sectional view taken along the line B—B of FIG. 8, that is a cross-section of a downward vertical guide.

FIG. 9 is a cross-sectional view taken along the line B—B of FIG. 8, that is a cross-section of an upward vertical guide, and FIG. 10 is a cross-sectional view taken along the line B—B of FIG. 8, that is a cross-section of a downward vertical guide.

The rectilinear, vertical guides 601, 602, and 603 comprise: ball screws 621, 622, and 623 for allowing the respective, fixed length links 401, 402, and 403 to vertically move by the respective actuators for vertical movement 701, 702, and 703; ball nuts 611, 612, and 613 for connecting the ball screws 621, 622, and 623 to the revolute joints 501, 502, and 503 connected with the respective, fixed length links 401, 402, and 403; and couplings 631, 632, and 633 for connecting the ball screws 621, 622, and 623 to the respective actuators for vertical movement 701, 702, and 703.

A rotational driving force of the actuators for vertical movement 701, 702, and 703 are transmitted to the ball nuts 611, 612, and 613 through the ball screws 621, 622, and 623, before transmitted to the fixed length links 401, 402, and 403 through the revolute joints 501, 502, and 503 connected to the ball nuts 611, 612, and 613. As a result, the fixed length links 401, 402, and 403 move along a vertical movement passage provided by the ball screws 621, 622, and 623.

The rectilinear, vertical guides 601, 602, and 603 are driven by respective actuators for horizontal movement 901, 902, and 903, to move horizontally on the circular, horizontal guide 8. For this horizontal movement, a ring gear 81 is provided outside the circular, horizontal guide 8, and pinion gears 821, 822, and 823 that are driven by the actuators for horizontal movement 901, 902, and 903, are provided at the rectilinear, vertical guides 601, 602, and 603. The pinion gears 821, 822, and 823 that are driven by the actuators for horizontal movement 901, 902, and 903, engage with the ring gear 81, so that the rectilinear, vertical guides 601, 602, and 603 perform their horizontal movements.

Rollers 83 are supplied to endure vertical load of the fixed length links 401, 402, and 403, a horizontal centrifugal force of the rectilinear, vertical guides 601, 602, and 603, and a horizontal or vertical internal force between robust bodies.

As mentioned above, by vertical movement of three fixed length links 401, 402, and 403 on the rectilinear, vertical guides 601, 602, and 603, and horizontal movement of three rectilinear, vertical guides 601, 602, and 603 on the circular, horizontal guide 8, the spindle is capable of motion in six degrees of freedom, to determine its position and orientation. As shown in FIG. 6, the machining center with six actuators including three actuators for vertical movement and three actuators for horizontal movement is called six-axis machining center.

The position and orientation of the tool for six-axis machining center are determined by rotation of the actuators for vertical and horizontal movements. In case of a computer numerical control machining center, input values of respective movement actuators that are determined by mechanical interpretation, are controlled numerically, such that the relative position and orientation of the tool with respect to a workpiece are controlled to shape and form useful, desired products.

Figure 11:
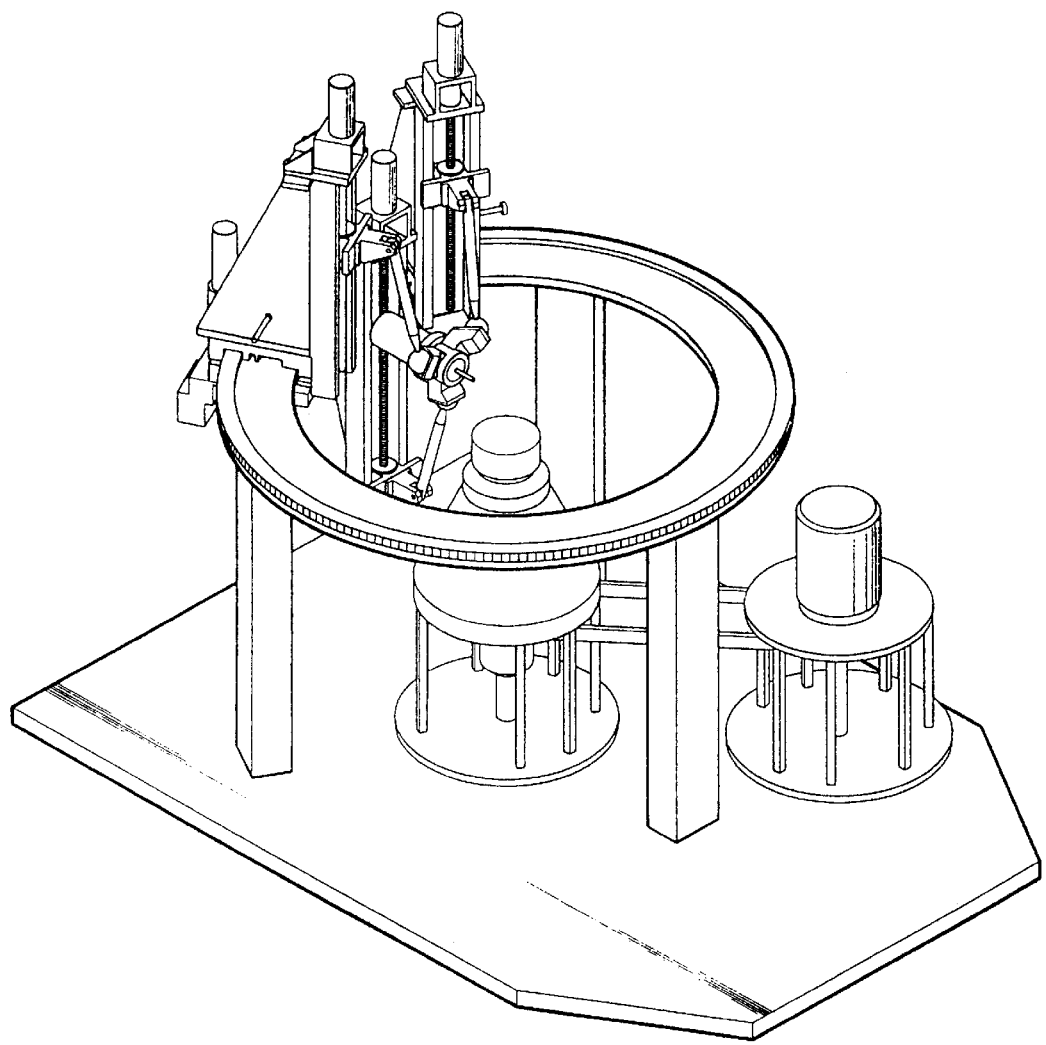
FIG. 11 is a perspective view of a state in which a spindle is at a tilting angle of 90° in the six-axis multi-machining type machining center of FIG. 6.

As illustrated in FIG. 11, in the six-axis multi-machining type machining center, the spindle is at a right angle with the workpiece, to perform a workpiece side machining by a single set-up.

A rotation angle of spherical joints 301, 302, and 303 for connecting the fixed length links 401, 402, and 403 to the spindle system, is the decisive element in determining the position and orientation of the tool. The range of vertical movement of the fixed length links 401, 402, and 403 on the rectilinear, vertical guides 601, 602, and 603, is set up, not to apply a burden to the spherical joints 301, 302, and 303. For this, a limit switch for fixed length link vertical movement limit 11 is formed at each of the rectilinear, vertical guides 601, 602, and 603.

Three rectilinear, vertical guides 601, 602, and 603 have their respective collision prevention limit switches 10 and 10' for preventing them from colliding with one another when they are driven by the respective actuators for horizontal movement 901, 902, and 903, to move horizontally on the circular, horizontal guide 8.

In general, the operation of the computer numerical control multi-machining type machining center is controlled by the variation in initial value determined by initial position and orientation of tool. Therefore, it is necessary to set up a zero point for determining an initial value. The present invention is constructed of a horizontal movement recovery limit switch 12 and a vertical movement recovery limit switch 13.

The six-axis multi-machining type machining center further includes a workpiece rotation system for turning a workpiece itself, in addition to the spindle system and movement system. The workpiece rotation system comprises: a fixing member 31 for fixing a workpiece 20; a chuck 32 for supporting the fixing member 31; an air compression cylinder 35 connected to the chuck 32; a pulley 33 for rotating the chuck 32; and a pulley driving motor 36 for operating the pulley 33. If the pulley driving motor 36 isn't a direct-coupled motor, a V-belt 34 is further included to transmit a rotational driving force of the pulley driving motor 36 to the pulley 33.

As shown in FIG. 11, the workpiece rotation system allows a vertical turning process, with the spindle at a right angle with the workpiece.

In the meantime, the parallel mechanism of the present invention may have the problem of actuator's singularity, that will be discussed hereinbelow.

A constraint equation of parallel mechanism is expressed by;

$$g(u,v)=0,\ u \in R^n,\ v \in R^m,\ g:R^n \times R^m \to R^m,$$

wherein u is indicative of a driving joint, and v is indicative of a passive joint.

It is found out from the equation that a joint space forms n-dimension manifold placed on a (n+m)-dimension space. If $\partial g/\partial v$ is invertible by implicit function theorem, v can be expressed as a function of u. If a rank of $\partial g/\partial v$ falls, not to express v by a function of u, all the driving joints are not driven independently. We call it actuator's singularity. No reaction force occurs with respect to an external force, actuators shake partially.

The following description will relate to the actuator's singularity of the six-axis machining center according to the present invention.

Figure 12:
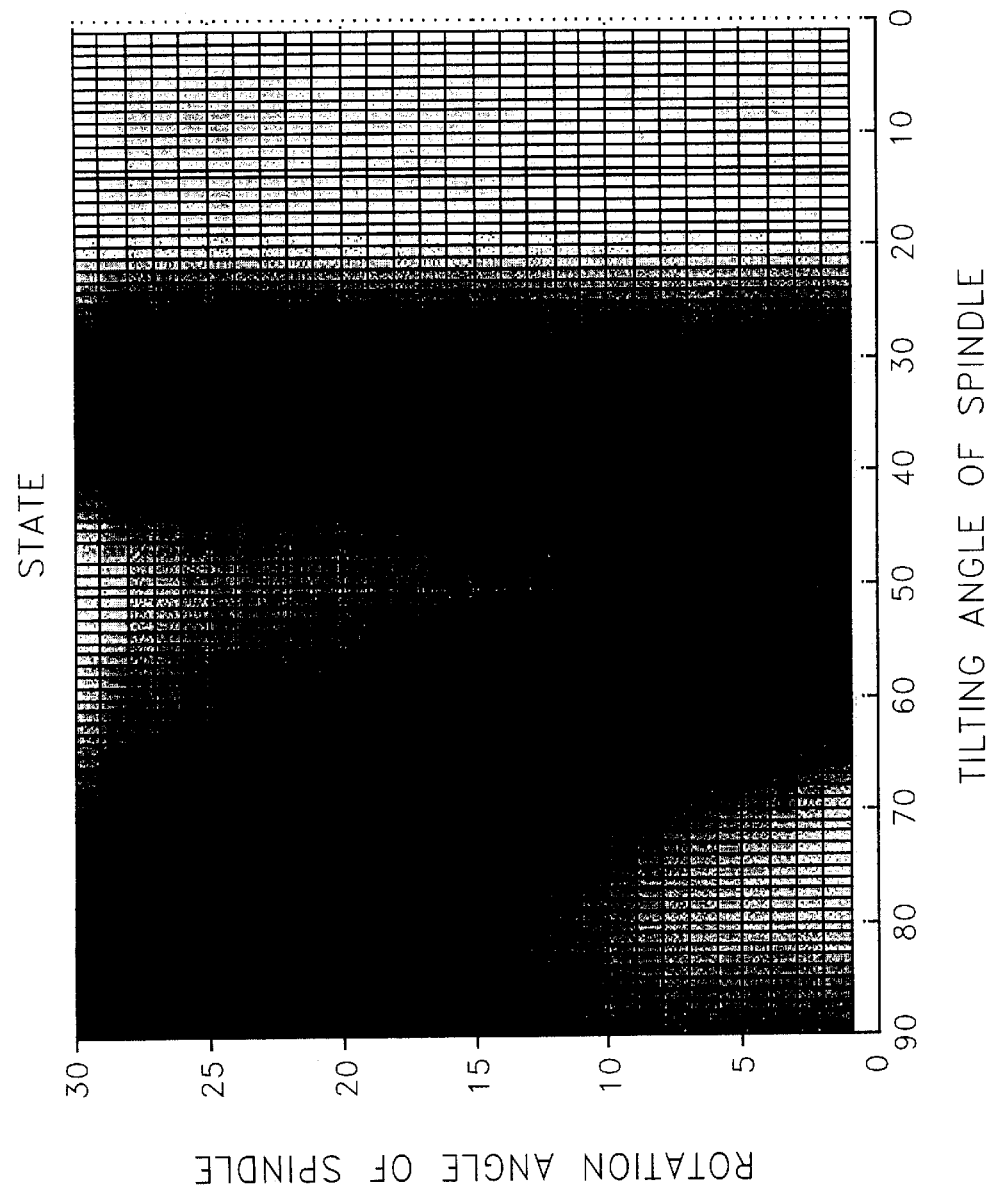
FIG. 12 depicts a Jacobian state in which a constraint equation is differentiated with respect to a passive joint variable when a tilting angle of the spindle changes from 0° to 90°, in the six-axis machining center shown FIGS. 6 to 11.

FIG. 12 depicts a Jacobian state in which a constraint equation is differentiated with respect to a passive joint variable when a tilting angle of the spindle changes from 0° to 90°, in the six-axis machining center shown FIGS. 6 to 11. A horizontal shaft is indicative of an angle of inclination of a spindle, and a vertical shaft is indicative of a rotation angle γ of a spindle itself.

A light part of FIG. 12 means that the spindle slopes smoothly, and a dark part of FIG. 12 means that there is an actuator's singularity, not to drive all the driving joints independently.

When a rotation angle γ of a spindle is 0°, a singularity occurs near the spindles of 36° and 57°. The dark parts in FIG. 12 never fail to meet each other no matter what rotation angle γ of spindle is set up, when an angle of inclination of spindle changes from 0° to 90°. The use of rotation angle γ of spindle, that is an excessive degree of freedom attained by rotating the spindle itself, can't avoid an actuator's singularity.

To solve the above-mentioned problem of actuator's singularity, the present invention provides an over-actuated machining center having an additional actuator for over-actuating passive joints, in addition to six actuators for actuating six driving joints. The additional actuator is at least more than one actuator.

A seven-axis machining center provided with an over-actuating actuator will now be described hereinbelow as a first embodiment of the present invention.

Figure 13:
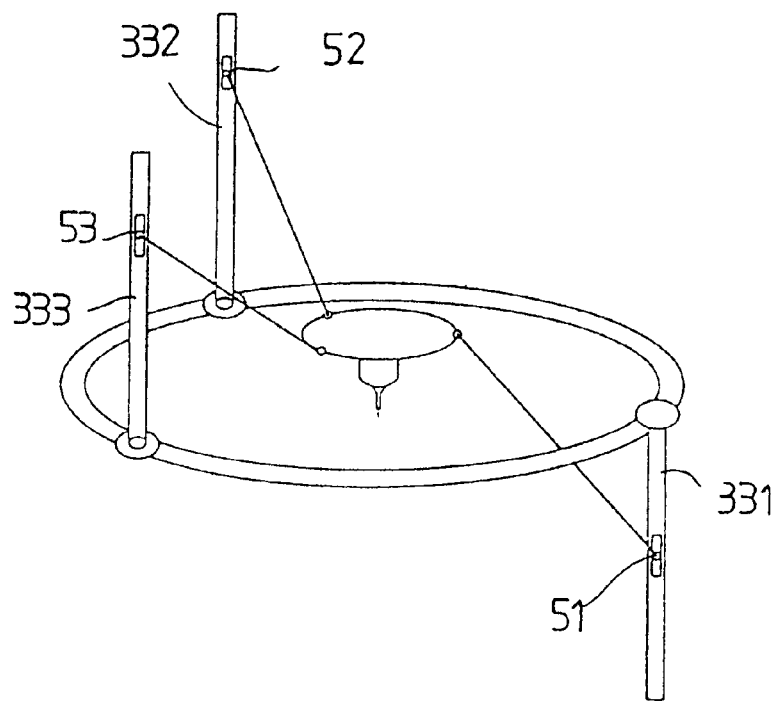
FIG. 13 shows passive joints where over-actuating actuators can be mounted.

FIG. 13 shows passive joints where over-actuating actuators can be mounted. Revolute joints 51, 52, and 53 of rectilinear, vertical guides 331, 332, and 333 of six-axis machining center are passive joints. The seven-axis machining center has a construction which mounts an over-actuating actuator at any one of the revolute joints 51, 52, and 53, to actuate them. For symmetrical structure, the over-actuating actuator is preferably mounted at the revolute joint 51 of the downward rectilinear, vertical guide 331.

Figure 14:
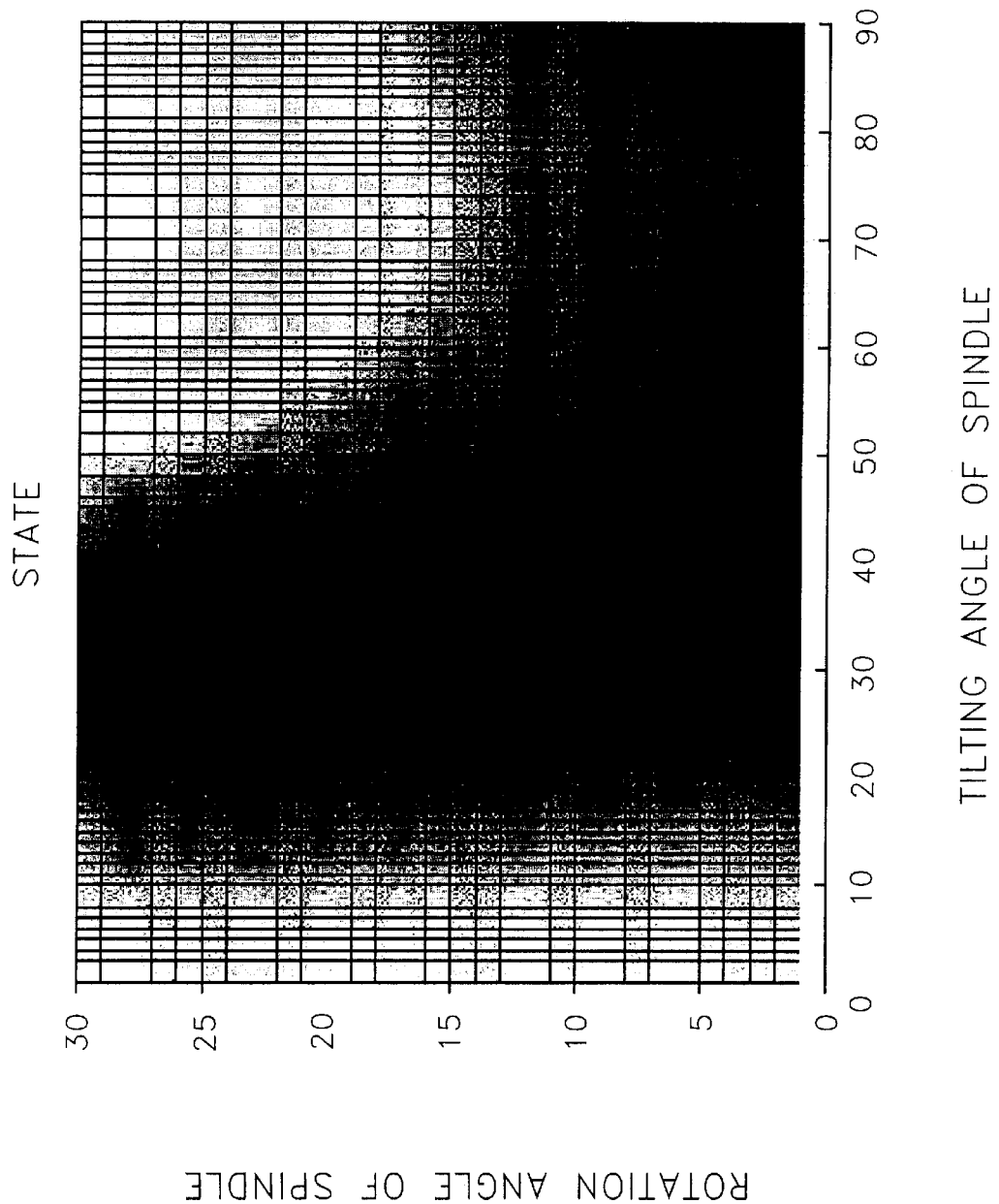
FIG. 14 depicts a Jacobian state in which a constraint equation is differentiated with respect to a passive joint variable when a tilting angle of the spindle changes from 0° to 90°, in a seven-axis machining center where over-actuating actuator is mounted at revolute joints of the downward vertical guide.

FIG. 14 depicts a Jacobian state in which a constraint equation is differentiated with respect to a passive joint variable when a tilting angle of the spindle changes from 0° to 90°, in the seven-axis machining center where over-actuating actuators are mounted at revolute joints of the downward vertical guides. A horizontal shaft is indicative of an angle of inclination of a spindle, and a vertical shaft is indicative of a rotation angle γ of a spindle itself. In case of seven-axis machining center, a singularity barrier disappears, and instead the singularity exists in the form of a point. And the singularity isn't a barrier near 36° of incline of spindle, but still exists badly.

This problem may be solved by adding another over-actuated actuator.

An eight-axis machining center with two over-actuating actuators is presented by the present invention. A sensitivity test to the revolute joints 51, 52, and 53, shown in FIG. 13 is performed to select a passive joint for adding an over-actuating actuator.

Among the respective passive joints 51, 52, and 53 shown in FIG. 13, the revolute joint 51 of downward rectilinear, vertical guide 331 is referred to as a first passive joint, the revolute joint 52 of upward rectilinear, vertical guide 332 as a second passive joint, and the revolute joint 53 of another upward rectilinear, vertical guide 333 as a third passive joint.

Figure 15:
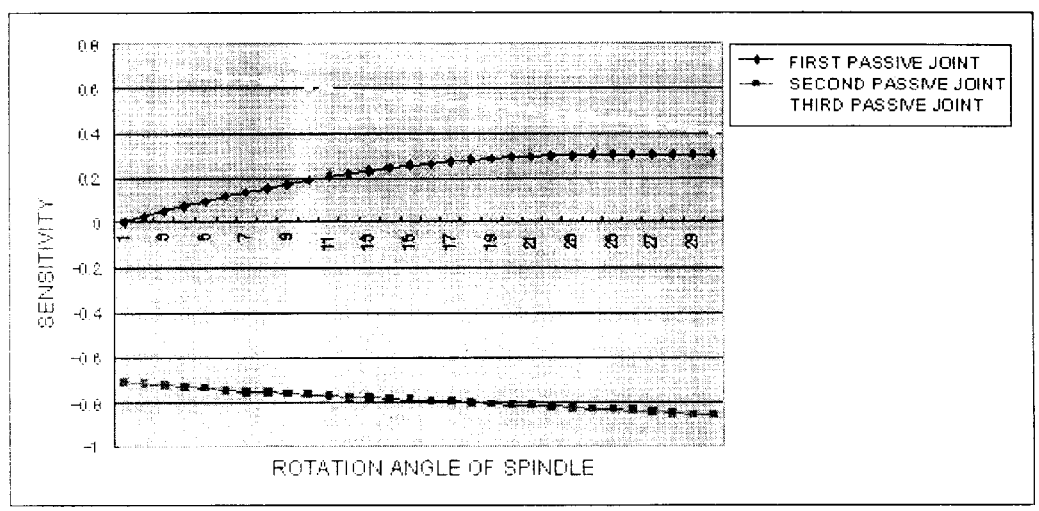
FIG. 15 shows that sensitivity of respective passive joints varies with a left singularity barrier (near 36° of incline of spindle) of FIG. 12.
Figure 16:
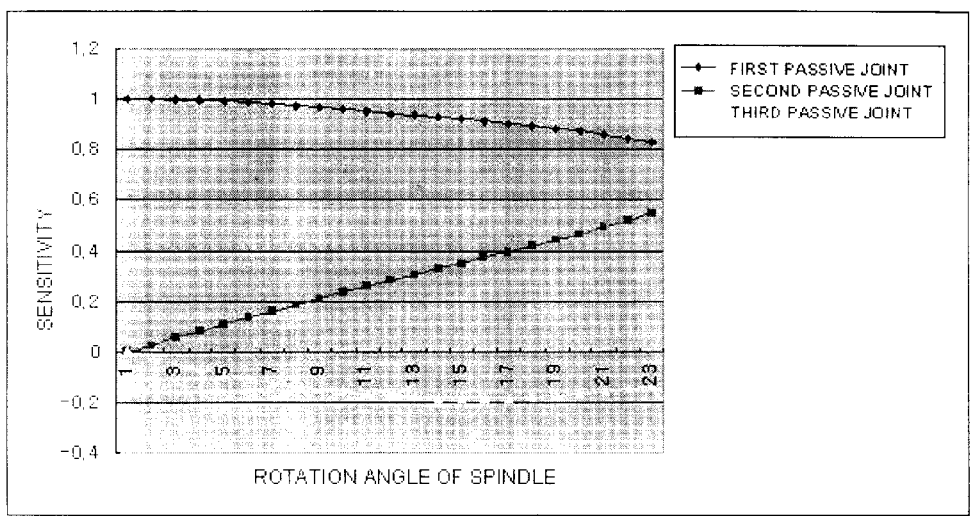
FIG. 16 shows that sensitivity of respective passive joints varies with a right singularity barrier (near 55° of incline of spindle) of FIG. 12.

FIG. 15 shows that sensitivity of respective passive joints varies with a left singularity barrier (near 36° of incline of spindle) of FIG. 12. FIG. 16 shows that sensitivity of respective passive joints varies with a right singularity barrier (near 55° of incline of spindle) of FIG. 12.

As depicted in FIG. 15, the sensitivity of first passive joint 51 is still smaller than that of other passive joints 52 and 53 with respect to left singularity barrier, but gets larger with increasing rotation angle of spindle. As shown in FIG. 16, however, the sensitivity of second and third passive joints 52 and 53 is smaller than that of first passive joint 51 with respect to right singularity barrier.

As FIGS. 15 and 16 show, the seven-axis machining center having one over-actuating actuator mounted at first passive joint 51 can't completely solve the problem of actuator's singularity near 37° of incline of spindle.

In the eight-axis machining center according to the present invention, a first over-actuated actuator is mounted at the first passive joint 51 that is a revolute joint of a downward rectilinear, vertical guide, and a second over-actuating actuator at either of the second and third passive joints 52 and 53 that are revolute joints of upward rectilinear, vertical guides.

The actuator's singularity is removed by the eight-axis over-actuated machining center of the present invention, and the spindle inclines smoothly with angles of 0° to 90°.

Referring to FIGS. 17 to 21, the eight-axis over-actuated machining center of the present invention will now be described in detail.

Figure 17:
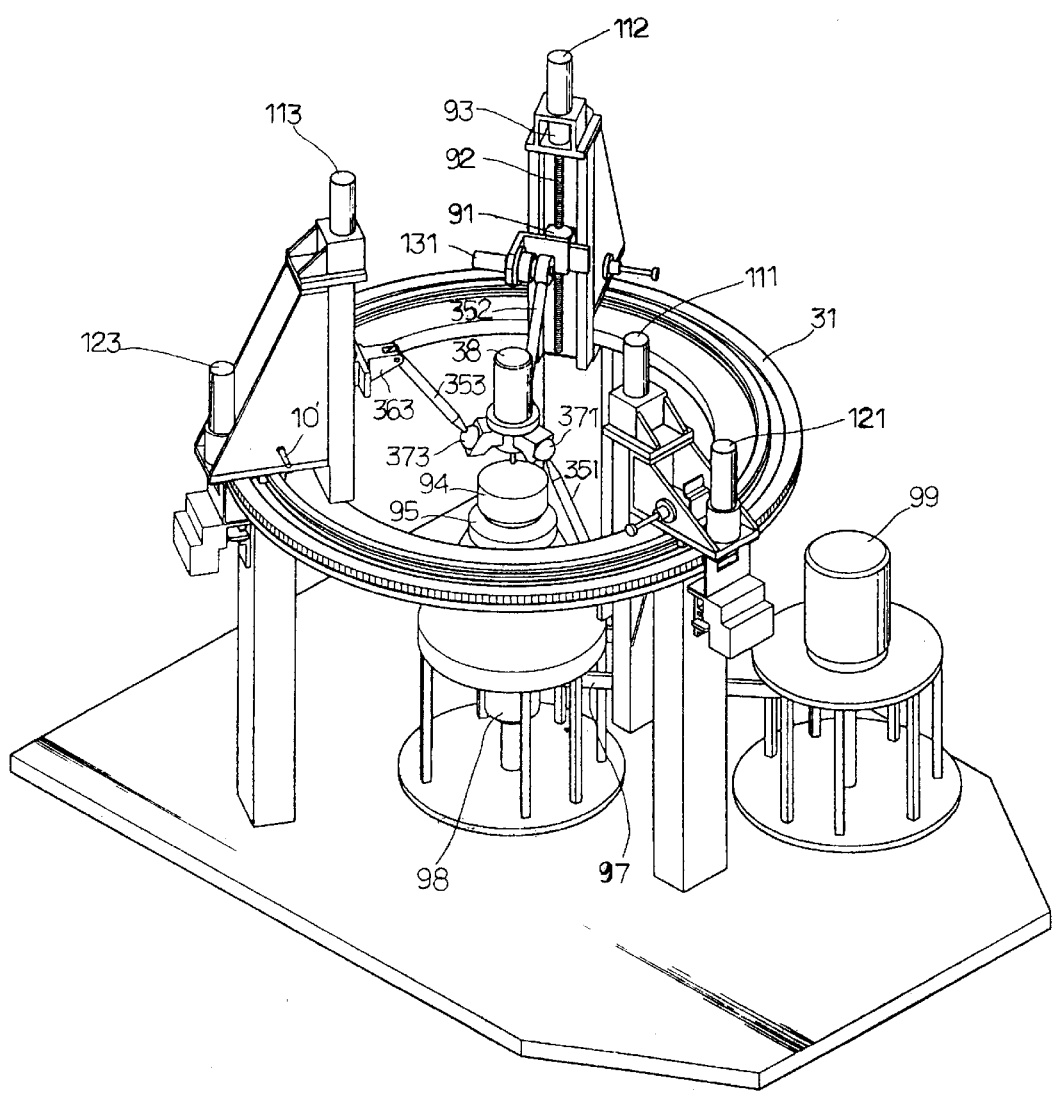
FIG. 17 is a perspective view of an eight-axis over-actuated machining center of the present invention.
Figure 18:
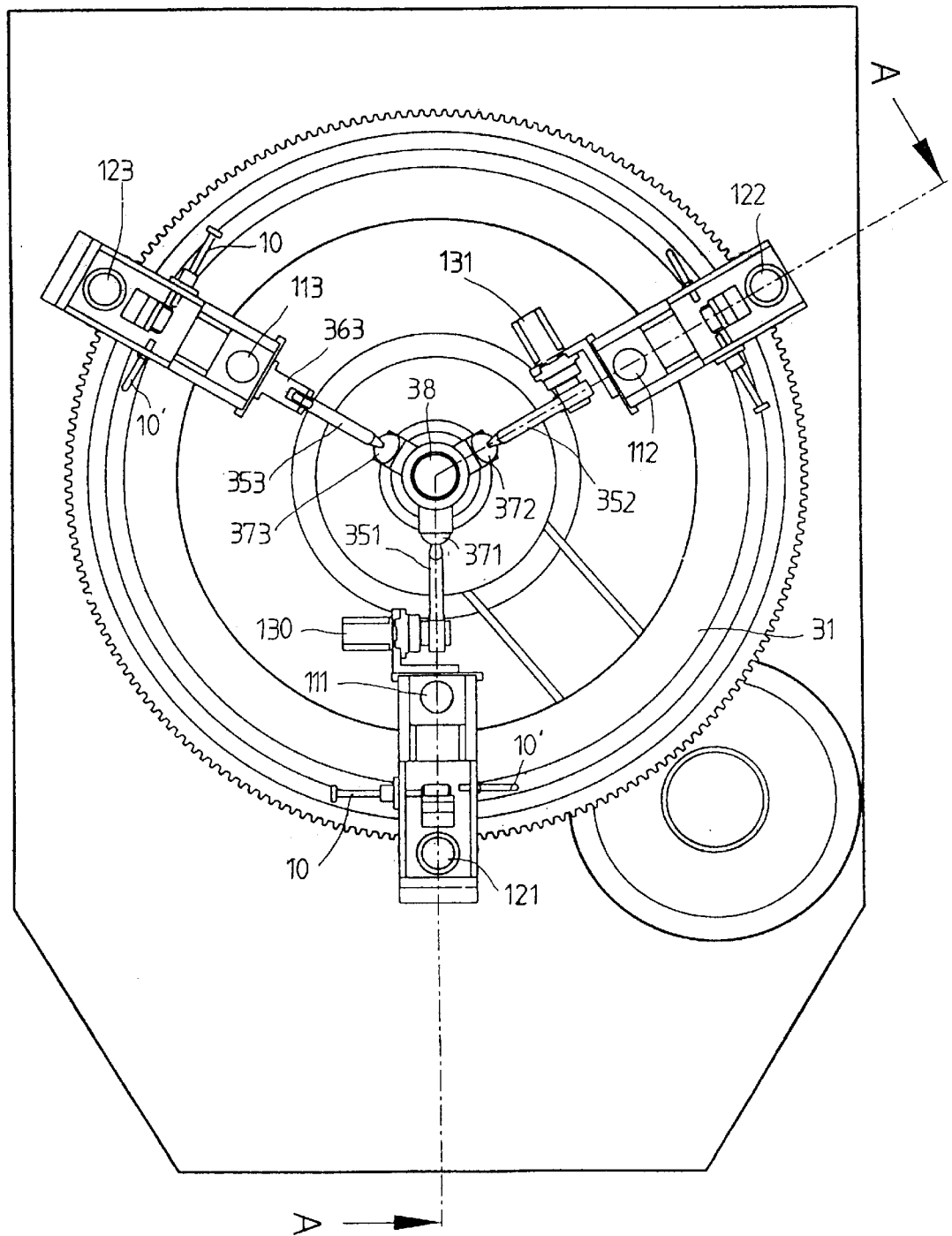
FIG. 18 is a plan view of the eight-axis over-actuated machining center of FIG. 17.
Figure 19:
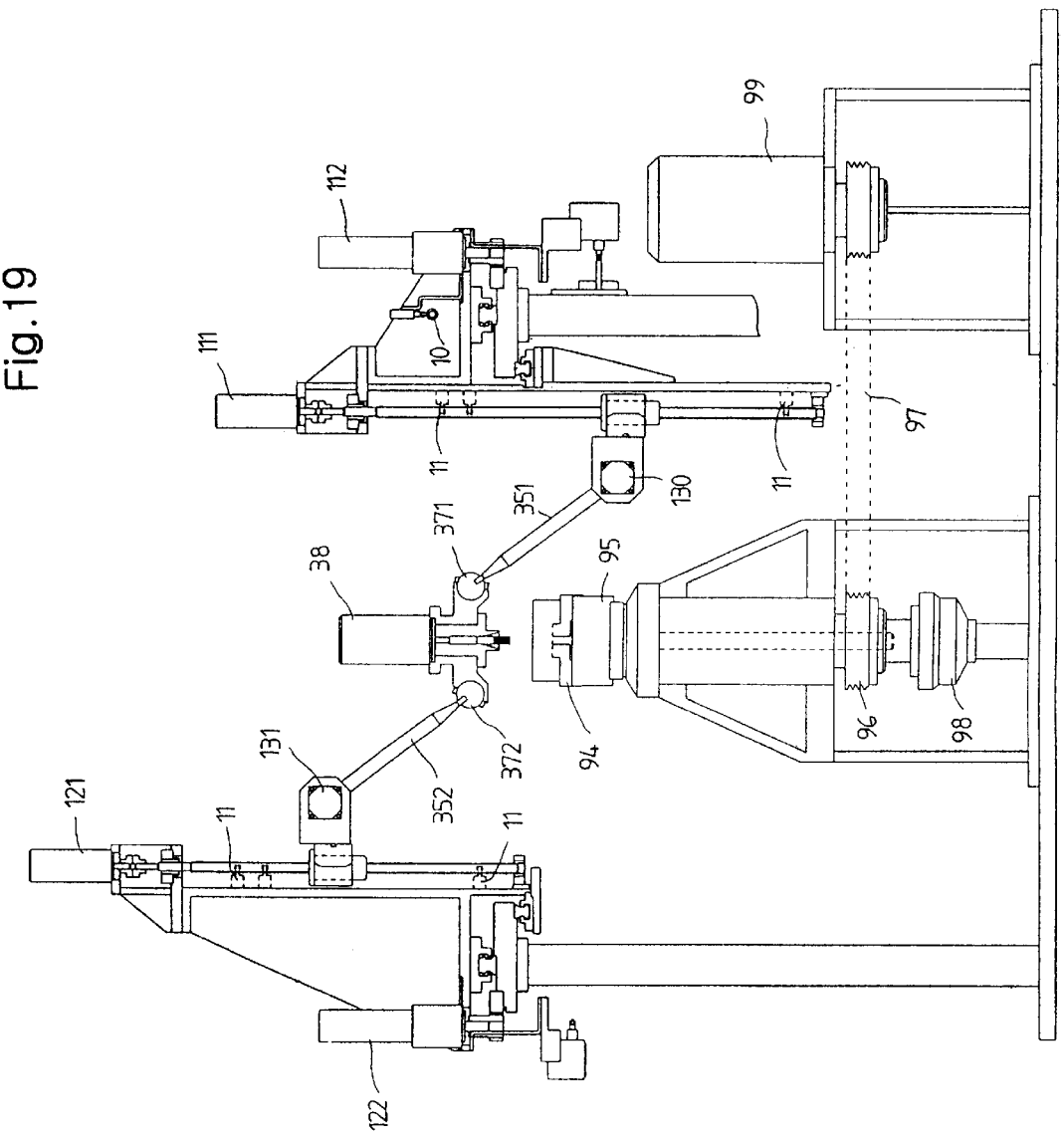
FIG. 19 is a cross-section as taken along the line A—A of FIG. 18.

FIG. 17 is a perspective view of the eight-axis over-actuated machining center of the present invention. FIG. 18 is a plan view of the eight-axis over-actuated machining center of FIG. 17. FIG. 19 is a cross-section as taken along the line A—A of FIG. 18. FIG. 20 in detail shows an upward rectilinear, vertical guide of the eight-axis over-actuated machining center of the present invention. FIG. 21 in detail shows a downward rectilinear, vertical guide of the eight-axis over-actuated machining center of the present invention.

The eight-axis over-actuated machining center has the same construction as a general machining center. That is, the eight-axis over-actuated machining center comprises: a spindle system having a tool and a spindle motor 38 for allowing rotation of the tool; a movement system for determining a position and orientation of the tool; and a workpiece rotation system for turning a workpiece.

The movement system has eight actuators including three actuators for vertical movement 111, 112, and 113, and three actuators for horizontal movement 121, 122, and 123 plus two over-actuating actuators 130 and 131.

The three actuators for vertical movement 111, 112, and 113 allow fixed length links 351, 352, and 353 to move on the rectilinear, vertical guides. A rotational driving force of three actuators for vertical movement 111, 112, and 113 are transmitted to ball nuts 91 through respective ball screws 92, before transmitted to the fixed length links 351, 352, and 353 through revolute joints 361, 362, and 363 connected to the ball nuts 91. As a result, the fixed length links 351, 352, and 353 move along a vertical movement passage provided by the ball screws 92.

The respective rectilinear, vertical guides move along a circumference passage provided by a circular, horizontal guide 31 by means of three actuators for horizontal movement 121, 122, and 123.

The revolute joint of downward rectilinear, vertical guide 331 is over-actuated by first over-actuating actuator 130, and the revolute joint of upward rectilinear, vertical guide 332 is over-actuating by second over-actuated actuator 131.

Two additional over-actuating actuators 130 and 131 remove the problem of actuator's singularity completely, and there is no shaking when an angle of inclination of spindle is changed from 0° to 90°.

In order to consider symmetry of over-actuated machining center and increase robustness of machining center, a nine-axis over-actuated machining center provided by the present invention, has a construction that mounts over-actuating actuators at all of revolute joints of three rectilinear, vertical guides. A position and orientation of a tool are controlled by nine actuators of the nine-axis machining center.

As described above, the over-actuated machining center of the present invention solves the problem of actuator's singularity that may be included in the parallel mechanism. Also, a turning process is possible with a tilting angle 90° of the spindle.

It will be apparent to those skilled in the art that various modifications and variations can be made in a parallel mechanism for multi-machining type machining center of the present invention without deviating from the spirit or scope of the invention. Thus, it is intended that the present invention cover the modifications and variations of this invention provided they come within the scope of the appended claims and their equivalents.

What is claimed is:

1. A parallel mechanism, comprising:
   three linear links, each link having a first end and a second end, the first end of each link being connected to a tool via a first joint allowing change of relative position or orientation between the tool and each link;
   three vertical guides, each vertical guide being connected to the second end of each link via a second joint allowing movement of the link connected thereto in a plane where the line and the vertical guide are located;
   a horizontal guide, each of the vertical guides being connected to the horizontal guide via a third joint allowing movement of the vertical guide connected thereto.

2. A mechanism as defined in claim 1, wherein the horizontal guide comprises a circular guide.

3. A mechanism as defined in claim 1, wherein the first joint comprises a spherical joint.

4. A mechanism as defined in claim 1, wherein the second joint comprises a revolute joint allowing movement of the first end of the link connected to the tool in the plane and a prismatic joint allowing vertical movement of the second end of the link along the vertical guide.

5. A mechanism as defined in claim 1, wherein the third joint comprises a prismatic joint allowing each vertical guide connected thereto horizontally move along the horizontal guide.

6. A mechanism as defined in claim 1, wherein the first joint is not driven by an actuator.

7. A mechanism as defined in claim 1, wherein the third joint is driven by an actuator.

8. A mechanism as defined in claim 4, wherein the prismatic joint is driven by an actuator.

9. A mechanism as defined in claim 4, wherein the revolute joint is driven by an actuator.

10. A mechanism as defined in claim 8, wherein at least one revolute joint is driven by an actuator.

11. A mechanism as defined in claim 1, wherein each of the at least three linear links has a fixed length.

12. A parallel mechanism for positioning and orienting a tool, comprising:
    at least three linear links, each of the links having a first end and a second end, the first end being connected to the tool;
    at least three vertical guide, each of the vertical guides being connected to the second end of each link such that the second end of each link can move along the vertical guide connected thereto; and
    a horizontal guide, each of the vertical guides being connected to the horizontal guide such that each vertical guide can move along the horizontal guide.

13. A mechanism as defined in claim 12, wherein each of the at least three linear links has a fixed length.

14. A mechanism as defined in claim 2, wherein each of the at least three linear links has the same length with one another.

15. A mechanism as defined in claim 13, wherein each of the at least three linear links has a different length with one another.

16. A mechanism as defined in claim 13, wherein each of the at least three linear links has the same length with one another.

17. A mechanism as defined in claim 12, wherein the horizontal guide comprises a horizontal circular guide, whereby each vertical guide can circle along the horizontal circular guide.

18. A mechanism as defined in claim 12, wherein all of the at least three vertical guides connected to the horizontal guide extend either upward or downward from the horizontal guide.

19. A mechanism as defined in claim 12, wherein at least one of the vertical guide extends both upward and downward from the horizontal guide so that the second end of each link connected to the at least one guide extending both upward and downward from the horizontal guide can move along between levels lower and higher than the horizontal guide.

20. A mechanism as defined in claim 12, wherein at least one of the vertical guide extends upward from the horizontal guide and the other vertical guides extends downward from the horizontal guide.

21. A mechanism as defined in claim 12, wherein the first end of each link is connected to the tool via a spherical joint.

22. A mechanism as defined in claim 12, wherein the second end of each link is connected to the vertical guide via a joint, wherein the joint allows movement of the first end connected to the tool in a plane where the link and the vertical guide are located, and the joint further allows vertical movement of the second end of the link along the vertical guide.

23. A mechanism as defined in claim 22, wherein the joint connecting the second end of each link to the vertical guide comprises a revolute joint and a prismatic joint.

24. A mechanism as defined in claim 12, wherein the vertical guide is connected to the horizontal guide via a prismatic joint.

25. A mechanism as defined in claim 22, wherein an actuator drives the joint to vertically move the second end of each link along the vertical guide connected thereto.

26. A mechanism as defined in claim 24, wherein an actuator drives the joint to horizontally move the vertical guide along the horizontal guide.

27. A machining system, comprising at least three linear links, a first end of each link rotatably connected to a tool, the second end of each link movably connected to each of at least three vertical guide which in turn is movably connected to a horizontal guide, thereby each of the vertical guides horizontally moving along the horizontal guide and each of the links moving such that the first end of each link connected to the tool moves in a plane where the link and the vertical guide are located and the second end vertically moves along the vertical guide.

28. A machining system as defined in claim 27, further comprising a supporter adapted to support an object to be machined, wherein the tool is to be positioned and oriented to machine the object.

29. A machining system as defined in claim 27, the tool is adapted to machine an object, including at least one selected from the group consisting of turning, boring, drilling, grinding, and milling.

30. A system as defined in claim 27, wherein each of the at least three linear links has a fixed length.

31. A system as defined in claim 30, wherein each of the at least three linear links has the same length with one another.

32. A system as defined in claim 27, wherein at least one of the vertical guides extends upward from the horizontal guide and the other vertical guides extend downward from the horizontal guide.

33. A system as defined in claim 27, wherein the first end of each link is connected to the tool via a spherical joint.

34. A system as defined in claim 27, wherein the joint connecting the second end of each link to the vertical guide comprises a revolute joint and a prismatic joint, wherein the revolute joint allows movement of the first end connected to the tool in a plane where the link and the vertical guide are located and the prismatic joint allows vertical movement of the second end of the link along the vertical guide.

35. A system as defined in claim 27, wherein the vertical guide is connected to the horizontal guide via a prismatic joint.

36. A system as defined in claim 34, wherein an actuator drives the prismatic joint.

37. A system as defined in claim 35, wherein an actuator drives the prismatic joint.

38. A system as defined in claim 27, wherein the horizontal guide comprises a circular guide.

39. A method for positioning and orienting a tool, comprising:

providing at least three linear links comprising a first end and a second end;

connecting the first end of each link to the tool for positioning and orienting;

vertically moving the second end of each link while allowing movement of the first end of the link in a plane defined by the vertical movement of the second end of the link and the link itself to effect movement of the tool; and horizontally moving each link to effect movement of the tool.

40. A method as defined in claim 39, wherein the horizontal movement of each link comprises horizontal and circular movement of the link around the tool.

41. A method as defined in claim 39, wherein the vertical movement of the second end of each link is driven by an actuator.

42. A method as defined in claim 39, wherein the horizontal movement of the second end of each link is driven by an actuator.

43. A mechanism as defined in claim 1, wherein two of the vertical guides extends upward from the horizontal guide and the other vertical guide extends downward from the horizontal guide.

* * * * *